(12) United States Patent
Kerner

(10) Patent No.: US 6,274,995 B1
(45) Date of Patent: Aug. 14, 2001

(54) METHOD AND CIRCUIT ARRANGEMENT FOR AUTOMATICALLY PARAMETERIZING A QUICK-ACTING DIGITAL SPEED CONTROL LOOP

(75) Inventor: Norbert Kerner, Traunwalchen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/416,319

(22) Filed: Oct. 12, 1999

(30) Foreign Application Priority Data

Oct. 9, 1998 (DE) .............................. 198 46 637

(51) Int. Cl.[7] .............................. G05B 1/02; G05B 13/00
(52) U.S. Cl. .......................... 318/611; 318/629; 318/630; 318/608
(58) Field of Search ..................................... 318/560–696; 364/148, 165, 724.19, 508, 192; 414/676; 356/358; 395/80; 901/45, 9

(56) References Cited

U.S. PATENT DOCUMENTS

| 4,603,284 | * | 7/1986 | Perzley ................................. 318/568 |
| 4,623,830 | | 11/1986 | Peneder et al. . |
| 4,792,737 | * | 12/1988 | Goff et al. ............................ 318/615 |
| 4,819,197 | * | 4/1989 | Blais ................................ 364/715.06 |
| 4,912,753 | * | 3/1990 | Evans, Jr. .............................. 364/513 |
| 4,980,625 | * | 12/1990 | Shimada ............................ 318/568.1 |
| 4,998,051 | * | 3/1991 | Ito ......................................... 318/632 |
| 5,049,796 | * | 9/1991 | Seraji ................................. 318/568.1 |
| 5,180,956 | * | 1/1993 | Oaki et al. ......................... 318/568.11 |
| 5,369,345 | | 11/1994 | Phan et al. . |
| 5,404,418 | | 4/1995 | Nagano . |
| 5,475,291 | | 12/1995 | Yoshida et al. . |
| 5,511,930 | * | 4/1996 | Sato et al. ............................. 414/676 |
| 5,525,877 | | 6/1996 | Umida . |
| 5,587,899 | | 12/1996 | Ho Weng K et al. . |
| 5,673,213 | * | 9/1997 | Weigl .............................. 364/724.19 |
| 5,686,806 | | 11/1997 | Hibbard . |
| 6,084,374 | * | 7/2000 | Nakatsuka et al. ............. 318/568.18 |

FOREIGN PATENT DOCUMENTS

| 25 20 649 | 8/1985 | (DE) . |
| 34 08 551 | 9/1990 | (DE) . |
| 41 22 391 A1 | 1/1993 | (DE) . |
| 195 16 402 | 1/1996 | (DE) . |
| 197 34 208 | 8/1997 | (DE) . |
| 197 57 715 A1 | 6/1999 | (DE) . |
| 0 523 252 A1 | 1/1993 | (EP) . |
| 0 817 377 A2 | 1/1998 | (EP) . |
| 90/08987 | 8/1990 | (JP) . |

\* cited by examiner

*Primary Examiner*—Paul Ip
(74) *Attorney, Agent, or Firm*—Kenyon & Kenyon

(57) ABSTRACT

A filter module inserted into a speed control loop to shorten the rise time of the loop. The filter parameters of the filters provided in the filter module and the controller parameters are calculated in such a way that instances of resonant rise. The amplification factors for the proportional controller branch and the integral controller branch are increased, which leads to a shorter rise time.

10 Claims, 4 Drawing Sheets

METHOD AND CIRCUIT ARRANGEMENT FOR AUTOMATICALLY PARAMETERIZING A QUICK-ACTING DIGITAL SPEED CONTROL LOOP

The present invention relates to a method for automatically parameterizing a quick-acting digital speed control loop, having branches excited separately by an excitation signal. The invention also related to a circuit arrangement for implementing a quick acting digital speed control in electro-drives.

DESCRIPTION OF RELATED ART

German Patent 195 16 402 Al, describes a circuit arrangement of a speed governor using a flexible feedback, where the feedback loop contains two models. A first model performs a partial approximation of the controlled system, a second model a full approximation of the controlled system. The output signal from the first model is fed back as a negative value while that of the second as a positive value, so that in the steady state condition the output signal from the two models should yield zero. A filter is arranged in the feedback loop, which uses as input signal the difference between the output signal from the second model and that from the controlled system. In this patent, the transfer function of the first model also includes the unstable poles of the controlled system.

One drawback of the method described above is the need to define two models, which can only be done with substantial outlay computational resources and with limited accuracy. The limited accuracy means that only an imprecise simulation of the controlled system is possible. The transfer functions of the models are high-order functions, so that the models are encumbered with many computational delays, leading to slow performance and additional inaccuracies.

German Patent 25 20 649 C2, describes a thermal power station having a side-water reactor, where a controlling system having frequency-dependent controlling elements is used. To prevent an unstable closed-loop feedback control, at least one resonant filter is arranged in the control loop, whose resonant frequency matches the frequency of the control loop. This prevents the control loop from becoming unstable. This document describes a resonant filter which is used in a control loop of a side-water reactor, not in a speed control loop. Furthermore, it also does not describe an automatic parameterizing of the filter in the control loop is.

German Patent 34 08 551 C2, describes a method for reducing tool path errors in computer-controlled machine tools, where positional setpoint values of the drive control loop are fed to a filter, which is active in response to changes in path vector. The response characteristic of the filter is the inverse of that of the drive's controlled system. A drawback of this implementation is that it requires determining the response characteristic of the drive's controller system as precisely as possible. However, this is only possible to accomplish with substantial effort and with limited accuracy. No provision is made for automatically assigning parameters to the filter in light of the control loop's resonant frequencies.

An arrangement and a method for determining optimal controller parameters for a closed-loop speed control are known from the German Patent 197 34 208.6. Test signals are applied to the electromotor of the installed machine, for whose speed controller the parameters are to be adjusted. These test signals activate selected controller components. A subsequent test is performed using an iterative method to determine at which amplification the stability limit of the individual control-loop components is reached. Depending upon the result, the amplification factors for the controller components are then adjusted. This method has the disadvantage that in one or more narrow-band resonant ranges of the mechanical system made up of the motor and the machine, vibrations can occur in response to low amplification factors of the speed controller. To avoid exciting the machine into vibrations in these resonant ranges, only low amplifications can be adjusted in the speed controller. Due to the low amplifications in the speed controller, setpoint values are reached only very slowly by the machine. Therefore, the so-called rise time is undesirably long.

SUMMARY OF THE INVENTION

The present invention is a method and a circuit arrangement that implements the method to permit automatic adjustment of the parameters of a speed control loop and of one or more filters provided in the speed control loop, to achieve a shortest possible rise time and an optimal feedback control performance, so that the machine is not excited into vibrations. The additional equipment and computational outlays required to obtain the necessary modules and process steps should be as small as possible.

Advantageous specific embodiments of the method and circuit arrangement according to the present invention follow from the features of each of the dependent claims.

To determine the optimal amplification of the speed controller, at least for the P- and I-branch of the speed controller, the resonant frequencies of the entire mechanical arrangement made up of the motor and the machine are determined at the same time in a frequency range relevant to the speed controller of the motor, at the stability limit of the speed control loop. Filters are located within the speed control loop, and their parameters are adjusted in such a way that instances of resonant rise in the frequency response characteristic are damped, and unwanted frequency ranges are suppressed. The output signal from the speed controller for resonant frequencies is damped in such a way that no more instances of resonant rise occur in the frequency response characteristic of the controller output signal. Thus, a signal is produced having an amplitude which is essentially constant over the frequency.

To achieve the desired rise time, the amplification factors of the controller are subsequently increased, and the determination is again made as to whether resonance occurs. If this is not the case, the adjustments in the filter and controller remain unchanged, since the desired rise time has now been achieved in this speed control loop without stability problems. If resonances are found, the filters are altered so as to damp the occurring resonant frequencies. After the filter coefficients are properly adjusted, the system checks again whether the desired rise time is reached and whether no resonance is occurring. If necessary, the resonant range of the mechanical arrangement is determined again, and amplification values in the controller, as well as filter coefficients of the filter are modified. In this manner, the filter parameters are additionally defined by using process steps which must be carried out in any case, to determine the controller parameters.

An especially short rise time can be advantageously achieved without the mechanical arrangement being excited in the process into continuing vibrations. Also, there is an additional benefit that there is no need for a mathematical modeling of the mechanical system. The mechanical arrangement is advantageously excited, as it is in regular operation with closed control loop, so that very realistic performance characteristics are determined for the mechanical system. The resonance ranges thereby determined are damped by filters, so that signals exciting a vibration are selectively damped. The amplification in the controller can be subsequently substantially increased.

BRIEF DESCRIPTION OF THE DRAWINGS

Further advantages of the invention and details pertaining thereto are explained in the following description on the basis of the specific embodiment illustrated in the drawings. In the drawings.

DETAILED DESCRIPTION OF THE INVENTION

The following discussion describes an embodiment of the present invention applied to a speed controller of a numerical control for an axle drive of a machine tool, adapted to achieve a very short, predefined rise time using the speed controller. The axle drive can be implemented in this case by a highly dynamic linear motor or by a conventional rotary servomotor.

Figure 1:
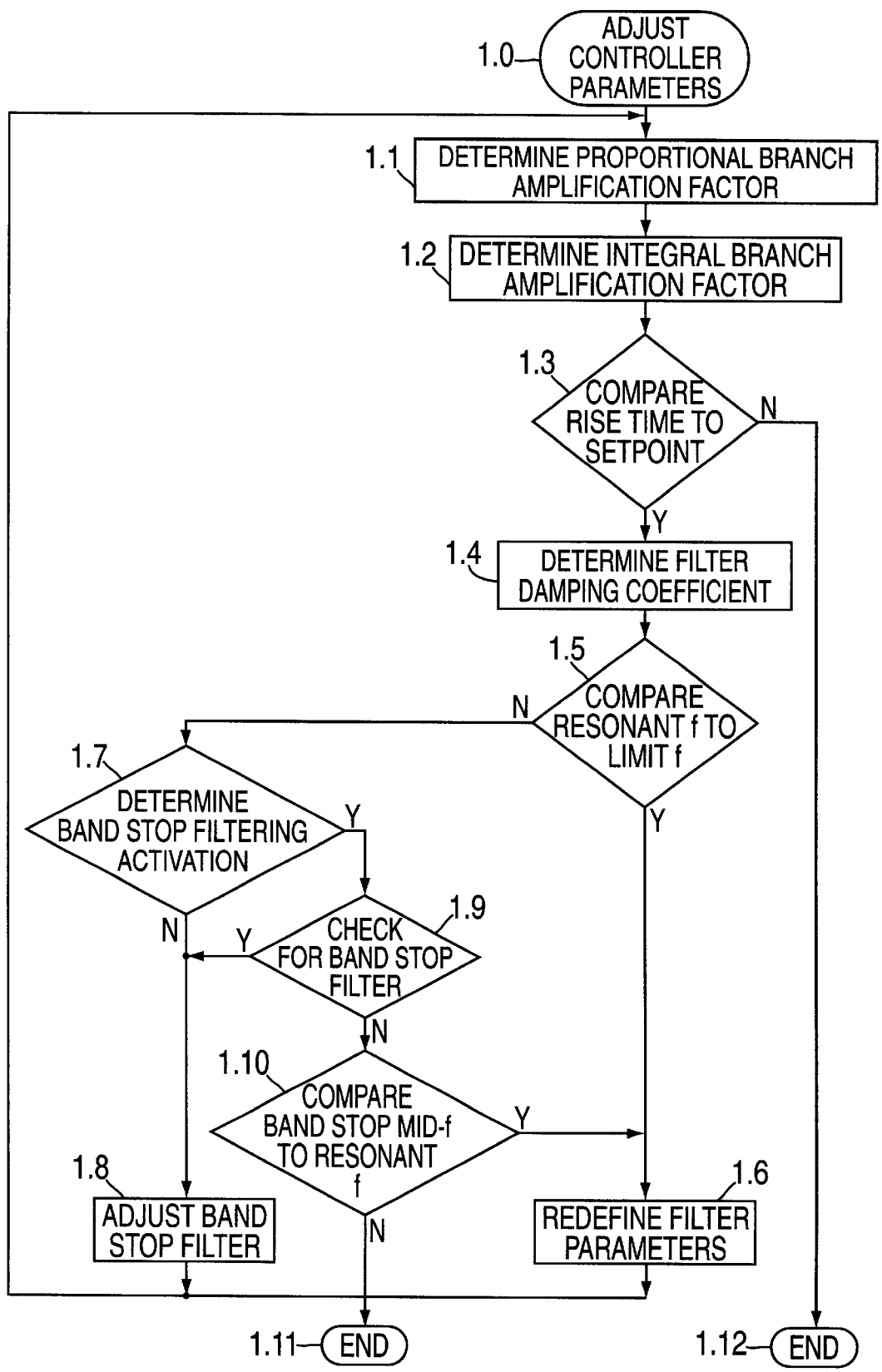
FIG. 1: is a flow chart showing a process sequence of one embodiment of the method according to the present invention.
Figure 2:
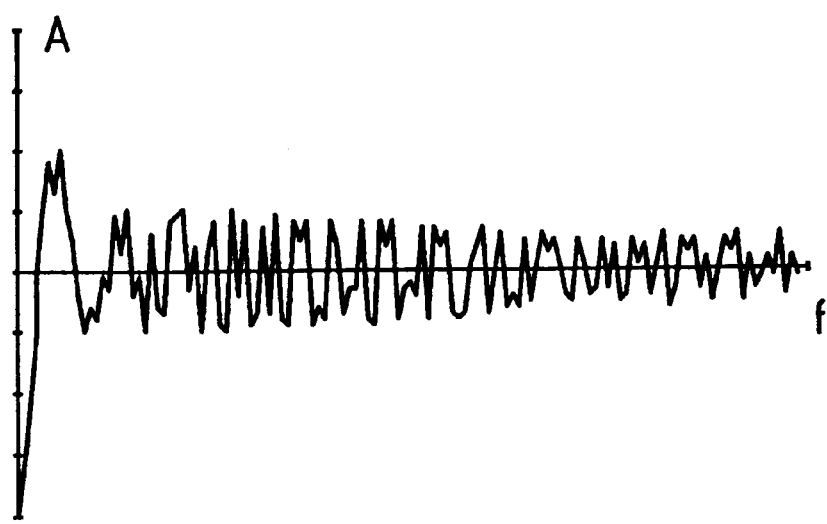
FIG. 2: is a diagram showing one possible excitation signal.

In accordance with FIG. 1, the method for adjusting the controller parameters of the speed controller, in its entirety, known from the German Patent 197 34 208.6 of the applicant, incorporated herein by reference, can be performed with step 1.0. Since a speed controller essentially has a PI-characteristic, the optimal amplification factor for the proportional branch is first determined in the proportional branch of the controller, with the aid of a special valuation function. Subsequently, in the integral branch, the amplification recognized as optimal is determined with the aid of a second special valuation function.

Figure 3:
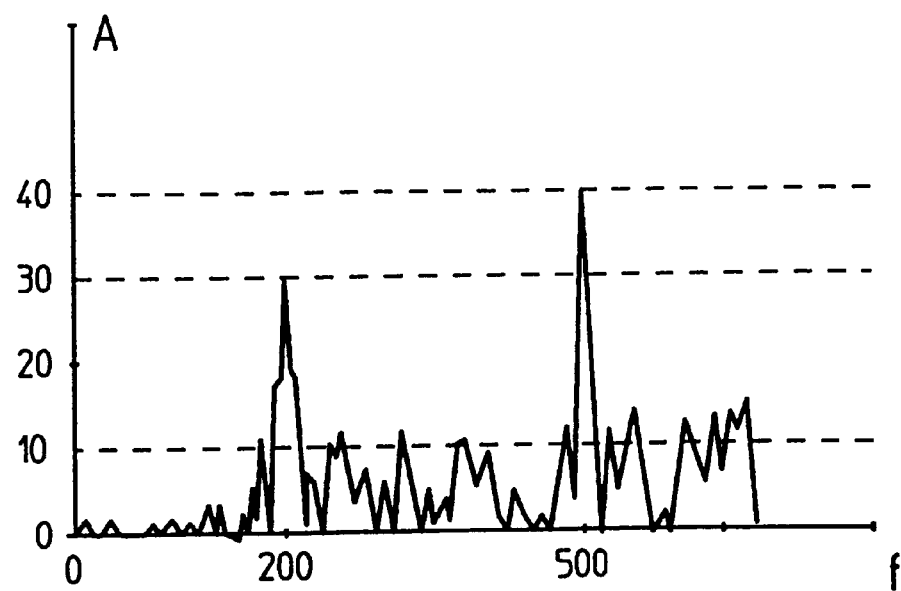
FIG. 3: is a diagram showing one possible frequency characteristic having two resonant frequencies.

In step 1.1, the amplification factor in the proportional branch of the controller is determined, for example, in accordance with the method described above in the known closed control loop. For this, the amplification in the proportional branch of the controller is increased for a short time so as to produce lasting vibrations in the control loop. During the lasting vibrations, the actual value fed back in the control loop is determined by a processor 4.4 over a specific time interval, and subjected to a Fourier transform. In this manner, for example, one can obtain the spectrum depicted in FIG. 3 for a frequency range of interest.

The frequency range of interest is preset so that its upper limit is established by the dynamics of the motor and by the cycle time of the control loop. For example, with a conventional rotary motor having a conventional control loop, signals of up to about 2 kHz can be of interest. When working with a highly dynamic linear motor, for example, signals of up to about 5 kHz can be of interest. The frequency range of interest is determined by the control cycle time of the speed control loop, which is tuned to the dynamics of the motor being used. The control cycle time can, for example, be set at about 2 ms, so that the frequency range of interest extends to about 500 Hz.

A first resonant frequency is recognized directly due to the maximum amplitude in the spectrum of the actual fed-back value in the control loop. This frequency must be damped by a filter 4.2.1 inserted into the control loop to increase the application factors in the speed controller, and to reduce the rise time in the PI-controller.

In step 1.2, the amplification factor in the integral branch is likewise determined in accordance with the method described above. Rise time $t_{a,actual}$ of the system is measured and compared in step 1.3 to a setpoint value $t_{a,setpoint}$. If the measured rise time $t_{a,actual}$ is shorter than the desired rise time $t_{a,setpoint}$, then there is no need to use a filter, nor for any further change in the controller amplifications. The method can then be ended in step 1.12.

Often, however, the measured rise time $t_{a,actual}$ is even greater than the desired rise time $t_{a,setpoint}$ and, in accordance with the method of the present invention, the damping coefficient $K_S$ of the filter for the resonant frequency to be inserted is determined in step 1.4 at least by approximation as the quotient of the measured rise time $t_{a,actual}$ divided by the desired rise time $t_{a,setpoint}$. This is done in accordance with the equation:

$$K_S = \frac{t_{a,actual}}{t_{a,setpoint}}. \tag{1}$$

Two resonant frequencies occur in the relevant frequency range in the selected exemplary embodiment. To damp the low resonant frequency, a band stop filter 4.2.2 is selected, and to damp the higher resonant frequency, a low-pass filter 4.2.1 is selected, which additionally suppresses higher frequency disturbances as well. For the case when more than two resonant frequencies occur in the relevant frequency range, the resonant frequencies which are above the frequency range of interest and the other high-frequency disturbances are suppressed by a low-pass filter, that is selected with a limit critical frequency so that the resulting resonant frequency at the edge limit of the frequency range of interest is damped by the required damping coefficient Ks. The remaining resonant frequencies in the frequency range of interest are damped by band-stop filters, whose damping and mid frequency parameters are selected in accordance with the resonant rise and resonant frequency in question. Although more than two resonant frequencies can be processed according to the invention, for the sake of simplification it is assumed in the following that only two resonant frequencies occur in the frequency range of interest, of up to 500 Hz. The higher frequency is damped by a low-pass filter 4.2.1, and the lower frequency by a band-stop filter 4.2.2.

The determination is made in step 1.5 as to whether the resonant frequency lies above a limit frequency for the application of a low-pass filter 4.2.1. This is necessary, since otherwise a low-pass filter 4.2.1 having a low limit frequency would damp fast controller output signals, making rapid controller operations impossible.

The parameters of a low-pass filter 4.2.1 are adjusted in step 1.6, in accordance with the frequency range of interest and the resonant frequency occurring at its upper limits, as well as in accordance with the damping coefficient Ks desired at this resonant frequency. Low-pass filter 4.2.1 is a second-order digital low-pass filter that can be selected with filter coefficients calculated by a processor 4.4, to conform with the desired limit frequency and damping. Alternatively, other filters having low-pass characteristics can also be used, in particular those filters of a higher order.

After the output signal from speed controller 4.1 is filtered in a low-pass filter to dampen the resonant rise, the amplification factors of speed controller 4.1 are re-established in the proportional and integral branch, in steps 1.1 and 1.2. Damping Ks is implemented to increase the amplification factors, and thus reduce rise time $t_{a,actual}$. At the same time, the still existing resonant frequencies and rise time $t_{a,actual}$ reached at this point are determined. It is then checked in step 1.3 whether rise time $t_{a,actual}$, reduced by the low-pass filtering, is already shorter than the desired rise time $t_{a,setpoint}$. If this is the case, there is no longer a need for a band-stop filter 4.2.2, and the amplifications set in speed controller 4.1 and the filter parameters of low-pass filter 4.2.1 are retrieved in step 1.12 to resume normal operation.

If the desired rise time $t_{a,setpoint}$ is not yet reached, a damping factor Ks required for band-stop filter 4.2.2 is determined in step 1.4 in accordance with the above equation (1). Subsequently, in step 1.5, the sequence branches over to step 1.7, since the remaining resonant frequency is lower than the limit critical frequency of the low-pass filter, which defines the upper limit of the frequency range of interest. Step 1.7 determines whether a band-stop filter 4.2.2 is activated. If this is not the case, the damping of band-stop filter 4.2.2 is adjusted in step 1.8 to conform with calculated damping Ks. The mid frequency of band-stop filter 4.2.2 is adjusted to conform with the ascertained resonant frequency.

In accordance with method steps 1.1 and 1.2, the amplification factors are subsequently redefined in the proportional and integral branch of controller 4.1. After band-stop filter 4.2.2 is also activated for the second resonant frequency, both resonant frequencies of the exemplary embodiment are damped, and the redefined, larger amplification factors result in rise time $t_{a,actual}$ being reduced. As a rule, in step 1.3 rise time $t_{a,actual}$ measured in view of the new amplification factors of the speed controller, is below the desired rise time $t_{a,setpoint}$, and the process comes to an end in step 1.12 after the ascertained parameters are set by processor 4.4 in filters 4.2.1 and 4.2.2, as well as in speed controller 4.1.

Figure 4:
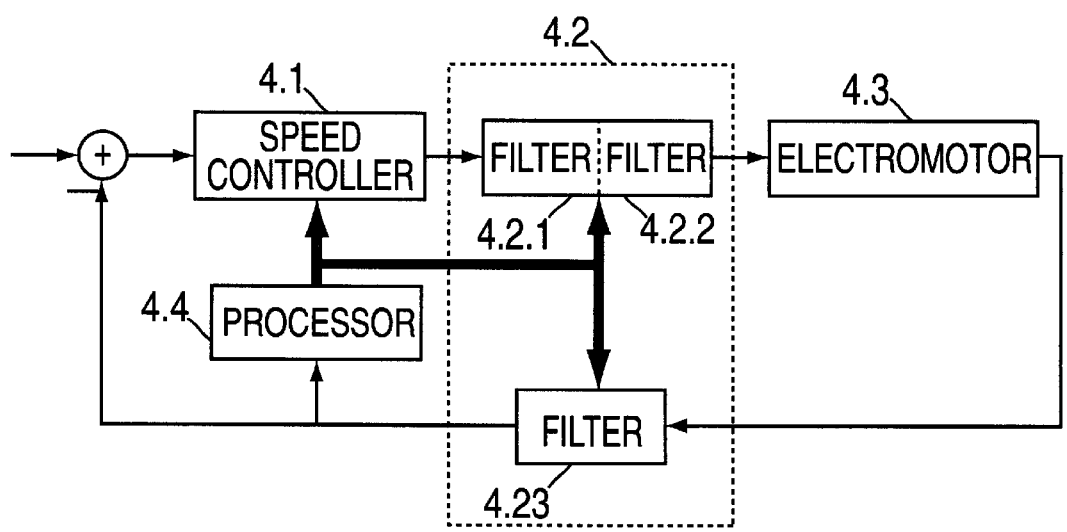
FIG. 4: is a schematic drawing showing an electrical circuit arrangement according to one embodiment of the present invention.

If, in spite of the damping of the two resonant frequencies from FIG. 4, rise time $t_{a,actual}$ is still too long, damping factor Ks is redefined in step 1.4 in accordance with equation (1). The determination whether or not the resonant frequency lies above the limit critical frequency of the low-pass filter is then made in step 1.5. If the resonant frequency lies above the limit frequency, the filter parameters of low-pass filter 4.2.1 are redefined, achieving an improved damping of the spurious interference signals outside of the frequency range of interest. If the resonant frequency is below the limit frequency of low-pass filter 4.2.1, the sequence branches over to step 1.7 and to step 1.9, since a band-stop filter 4.2.2 is already active.

Step 1.9 checks if a band-stop filter 4.2.2 is already provided for the resonant frequency and, if indicated, if the filter's parameters are redefined. In this manner, the filter characteristics of band-stop filter 4.2.2 are finely adjusted to the characteristics of the speed control loop, which may have been slightly changed by filters 4.2.1 and 4.2.2 if they were activated. If the resonant frequency is above the mid frequency of band-stop filter 4.2.2, the sequence branches over in step 1.10 to step 1.6, and the parameters of low-pass filter 4.2.1 are redefined. In this manner, the filter characteristics of low-pass filter 4.2.1 are finely adjusted to the characteristics of the speed control loop, which had been slightly modified by activation of filters 4.2.1 and 4.2.2.

If the resonant frequency lies below the mid frequency of the existing band-stop filter 4.2.2, then, in accordance with the exemplary embodiment, the adjustments end with the result that no further improvement in the rise time is achieved.

Alternatively, it is also possible at this point to insert a further band-stop filter, to dampen an additional resonant frequency. Thus, with each additional band-stop filter, an additional resonant frequency could be damped, and the rise time $t_{a,actual}$ improved.

Instead of a plurality of filters, the option also exists to use only one single, higher-order filter, which implements the function of low-pass filter 4.2.1 and of band-stop filters 4.2.2. In response to each resonant frequency of the drive system, the filter exhibits a defined damping Ks and fully suppresses high frequencies.

A method in accordance with the present invention is initiated by user control, and subsequently proceeds automatically. If the closed-loop control circuit has a suitable connection via a parallel or serial interface to a data network (local area network or wide area network, such as the Internet), then one can also start determining the parameters for the controllers and filters of the control loop in a remote control operation. The newly determined parameters for the controllers and filters are either adjusted immediately or first communicated to the user, who can then adjust the parameters himself or herself.

Figure 5:
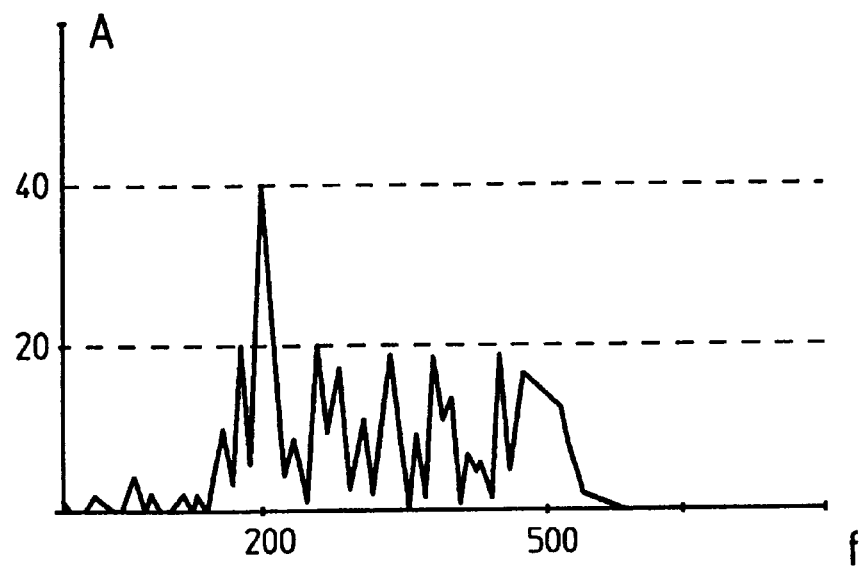
FIG. 5: is a diagram showing the frequency characteristic from FIG. 3 following a low-pass filtering of the dominant resonant frequency according to the invention.
Figure 6:
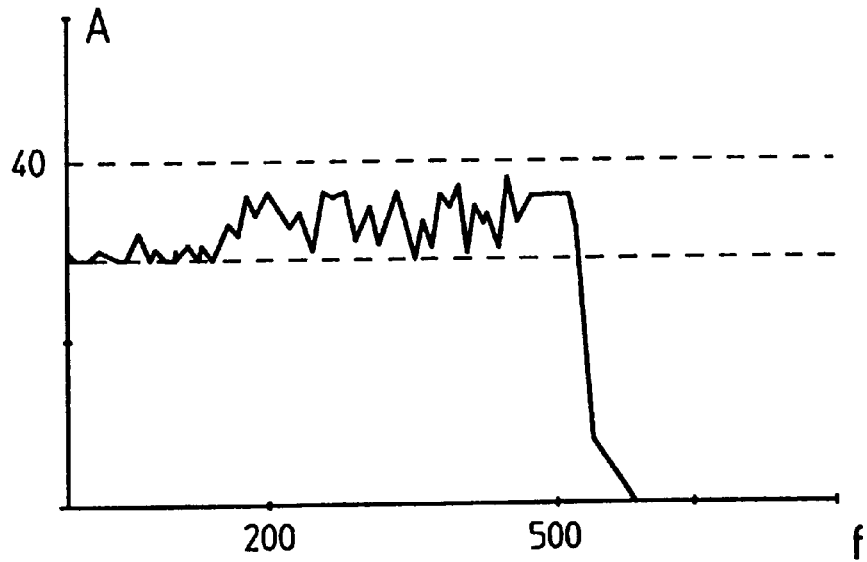
FIG. 6: is a diagram showing the frequency characteristic from FIG. 5 following a band-stop filtering of the further resonant frequency according to the invention.

The effect of application of the method according to the present invention is shown in FIGS. 5 and 6, by way of example. The starting point is the signal pattern shown in FIG. 3, which has a dominant resonance at 500 Hz and has a further resonance at 200 Hz and which, given a normalized amplitude of 40 of the dominant resonance, is at the critical stability limit. In steps 1.1 and 1.2, these characteristic quantities of the signal are automatically determined according to the method of the present invention. Subsequently, a low-pass filtering is initially applied to the dominant resonance at 500 Hz, since this frequency lies at the limit of the frequency range of interest. This is determined by the controller acting cycle time of the speed control loop, which can lie, for example, at about 2 ms, so that the frequency range of interest extends up to about 500 Hz. The resonant rise at 500 Hz is eliminated, and the amplification factors in the speed controller can be increased in a second process run-through in such a way that the resonance at 200 Hz defines the stability limit of the control loop, as shown in FIG. 5.

This resonance is again damped in a second process run-through by a band-stop filter, so that an output signal without significant instances of resonant rise is produced. At this point, the amplification factors in the speed controller can be increased until the critical stability limit of the control loop is substantially reached.

The output signal shown in FIG. 6 is produced in the manner described. Since all resonant frequencies are eliminated by using both the low-pass filter 4.2.1 and the band-stop filter 4.2.2 shown in FIG. 4, the amplifications in the speed controller could be increased to an optimal value, and rise time $t_{a,actual}$ of the control loop reduced accordingly.

When applied to a speed control circuit for an electromotor 4.3 of a machine tool, the circuit arrangement according to the present invention shown in FIG. 4 has a filter module 4.2. This filter module 4.2 is arranged directly downstream from the speed controller 4.1, and filters the control signal supplied to electromotor 4.3 for the motor currents. Filter module 4.2 can be implemented by a plurality of low-order filters, such as by a second-order low-pass filter 4.2.1 and by a band-stop filter 4.2.2. Alternatively, filter module 4.2 can be implemented by a single higher-order filter. Either option is acceptable, if the filter characteristics required for damping resonant rises are implemented by filter module 4.2.

The arrangement of filters 4.2.1, 4.2.2, 4.2.3 is possible at any desired location in the speed control circuit. If a plurality of filters are used to damp instances of resonant rise, then these filters can also be arranged at different locations in the speed control circuit. The controlled system shown in FIG. 4 includes electromotor 4.3 and the mechanical components connected thereto. In the case of an axle drive, these can be, for example, the coupling, recirculating ball screw, and sliding carriage upon which the tool is secured. In this manner, for example, the inertia torques and friction losses of the components enter into the determination of the controller and filter parameters as well. To be able to consider, to the greatest extent possible, all of the influences occurring in operation with the greatest possible accuracy, the method is additionally carried out when working with a closed control loop.

To implement the method according to the present invention, it is necessary that the filters used, for example filters 4.2.1, 4.2.2 and 4.2.3, as well as the speed controller 4.1 be designed to have parameters capable of being modified, for example, by a processor 4.4. For this, a connection is provided between controller 4.1 and processor 4.4, as well as between filters 4.2.1, 4.2.2 and 4.2.3 and processor 4.4. Through this connection, shown by full arrows in FIG. 4, processor 4.4 transmits the calculated parameters to the other components. In addition, processor 4.4 has an interface via which a start signal can be transmitted to processor 4.4 to start the process of determining the controller parameters, filter parameters, as well as additional data. This interface can have a parallel or serial design, and can be used as a connection to a local area network or a wide area network, such as the Internet.

It is also necessary that an excitation signal be fed to the closed control loop, to ascertain the closed-loop control circuit's tendency to oscillate in response to a defined excitation. For this, a circuit arrangement is provided, by way of which a signal generator for the excitation signal is linked to the closed-loop control circuit.

The present invention can be applied to all closed-loop control circuits where the control circuit dynamic response is reduced by at least one narrow-band resonant rise, and very different configurations of controlled systems can be so controlled.

What is claimed is:

1. A method for automatically parameterizing a quick-acting digital speed control loop in electro-drives of machine tools and robots that have a controller including branches with separately determined controller parameters and one or more filters, comprising:

determining an optimal value for at least one controller parameter associated with at least one branch of the controller with the aid of a specialized valuation function;

increasing the value of the controller parameter to produce vibrations in the control loop, the vibrations being associated with at least one resonant frequency;

determining at least one resonant frequency of the control loop;

calculating a damping factor for at least one filter, the damping factor being associated with the resonant frequency and equal to an actual rise time divided by the desired rise time; and modifying the value of the controller parameter in accordance with the damping factor.

2. A method for automatically parameterizing a speed control loop in a controller having branches with different controller characteristics and one or more filters, comprising:

determining an optimal value for at least one controller parameter associated with at least one branch of the controller;

modifying the value of the controller parameter to produce vibrations in the control loop, the vibrations being associated with at least one resonant frequency;

determining at least one resonant frequency of the control loop;

determining at least one filter parameter associated with at least one of the filters, the filter parameter damping the resonant frequency in accordance with a desired rise time; and modifying the value of the controller parameter in accordance with the filter parameter.

3. The method of claim 2, wherein said controller parameter is an amplification factor in a proportional branch of the controller.

4. The method of claim 3, wherein said modifying the value of the controller parameter further includes increasing the amplification factor.

5. The method of claim 2, wherein said determining at least one resonant frequency further includes:

determining a control loop feedback value over a specific time interval;

performing a Fourier transform on the control loop feedback value; and obtaining a frequency spectrum associated with the Fourier transform.

6. The method of claim 5, further comprising:

determining a maximum amplitude of the frequency spectrum; and determining the resonant frequency from the maximum amplitude.

7. The method of claim 2, wherein said determining at least one filter parameter further comprises determining the coefficients for a digital low-pass filter that damps frequencies above a predetermined frequency limit.

8. The method of claim 2, wherein said determining at least one filter parameter further comprises determining the coefficients for a digital notch filter that damps frequencies in a predetermined frequency band.

9. The method of claim 2, wherein said controller parameter is an amplification factor in an integral branch of the controller.

10. The method of claim 9, further comprising:

determining an actual rise time; and calculating a damping factor for at least one filter, the damping factor being associated with the resonant frequency and equal to the actual rise time divided by a desired rise time.

* * * * *